United States Patent
Chiu

(10) Patent No.: US 10,676,147 B2
(45) Date of Patent: Jun. 9, 2020

(54) MOBILE VEHICLE, SAFETY WARNING DEVICE AND SAFETY WARNING METHOD

(71) Applicant: Issa Technology Co., Ltd., Taoyuan (TW)

(72) Inventor: Chi-Wei Chiu, Taoyuan (TW)

(73) Assignee: ISSA TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 16/178,741

(22) Filed: Nov. 2, 2018

(65) Prior Publication Data

US 2019/0283828 A1 Sep. 19, 2019

(30) Foreign Application Priority Data

Mar. 15, 2018 (TW) .............................. 107108775 A

(51) Int. Cl.
| | |
|---|---|
| *B62J 6/00* | (2020.01) |
| *B62J 3/00* | (2020.01) |
| *B62J 6/01* | (2020.01) |
| *G01S 11/12* | (2006.01) |

(52) U.S. Cl.
CPC . *B62J 6/01* (2020.02); *B62J 3/00* (2013.01); *G01S 11/12* (2013.01)

(58) Field of Classification Search
None
See application file for complete search history.

(56) References Cited

U.S. PATENT DOCUMENTS

| | | | |
|---|---|---|---|
| 8,941,482 B1* | 1/2015 | Gouverneur | B60Q 1/40 340/465 |
| 9,457,709 B2* | 10/2016 | Alataas | B60Q 1/2676 |
| 10,029,173 B2* | 7/2018 | Itoh | A63F 13/10 |
| 2007/0067079 A1* | 3/2007 | Kosugi | G07C 5/085 701/32.4 |
| 2011/0148611 A1* | 6/2011 | Ni | B62J 6/04 340/432 |
| 2014/0309841 A1* | 10/2014 | Hara | G05D 1/024 701/26 |
| 2015/0228066 A1* | 8/2015 | Farb | G06K 9/00805 348/148 |
| 2016/0023703 A1* | 1/2016 | Braggin | B62J 27/00 362/473 |
| 2018/0001952 A1* | 1/2018 | Rajamani | B62J 27/00 |
| 2018/0020528 A1* | 1/2018 | Luk | F21S 9/02 |
| 2018/0050752 A1* | 2/2018 | Wang | B62J 6/005 |
| 2018/0108258 A1* | 4/2018 | Dilger | G08G 1/167 |
| 2018/0275278 A1* | 9/2018 | Yamada | G01C 3/085 |
| 2019/0129035 A1* | 5/2019 | Valouch | G01S 7/4815 |
| 2019/0250619 A1* | 8/2019 | Gillett | B62J 3/00 |
| 2019/0261724 A1* | 8/2019 | Chen | B60Q 1/44 |

* cited by examiner

*Primary Examiner* — Chico A Foxx
(74) *Attorney, Agent, or Firm* — McClure, Qualey & Rodack, LLP

(57) ABSTRACT

A safety warning method includes the following steps. Step 1 is to generate a plurality of distance sensing signals by an optical object ranging module according to an approaching object. Step 2 is to obtain a relative distance trend according to the distance sensing signals and its corresponding time. Step 3 is to generate a control signal according to the relative distance trend. Step 4 is to drive and control a warning device to generate a warning signal according to the control signal. In addition, the present invention also provides a mobile vehicle and a safety warning device.

11 Claims, 6 Drawing Sheets

MOBILE VEHICLE, SAFETY WARNING DEVICE AND SAFETY WARNING METHOD

CROSS REFERENCE TO RELATED APPLICATIONS

This Non-provisional application claims priority under 35 U.S.C. § 119(a) on Patent Application No. 107108775 filed in Republic of China on Mar. 15, 2018 the entire contents of which are hereby incorporated by reference.

BACKGROUND

1. Technical Field

The present invention generally relates to a safety warning device and a safety warning method. More particularly, the present invention relates to a safety warning device which can be installed by the user himself/herself and a corresponding safety warning method.

2. Description of Related Art

Nowadays, people often take jogging or biking as exercise in their daily life. However, for most ones, such exercises are usually scheduled in the early morning or the night, since their daytime is usually occupied by job or school.

Unlike cars or motorcycles which are mostly equipped with strong lights to provide illumination and warn other drivers behind, however, bicycles are seldom equipped with such lights. Furthermore, bikers or joggers usually neither have such strong lights on their own. Accordingly, when biking or jogging in the early morning or the night with a lack of sunlight, one can hardly warn, alert or hint other drivers or joggers from the rear.

Even though bicycles or bikers/joggers can be equipped with a light reflecting gear, however, reflected light therefrom can merely achieve limited intensity and thus still fails to make warning or alerting effective. In addition, for the light reflecting gear to provide reflected light, external light sources are usually required. Accordingly, the light reflecting gear will fail its function if cars from the rear shut down their light, and bikers or joggers may thus encounter danger under the above circumstance.

Given the above, it may therefore be desirable to have a safety warning device and a safety warning method, which can warn or alert other ones and thereby secure the user (biker or jogger) himself/herself.

SUMMARY OF THE INVENTION

It is therefore an object of the present invention to provide a mobile vehicle, a safety warning device and a safety warning method which can dynamically warn or alert any approaching object and thus catch its attention, and safety for user of the safety warning device and safety warning method can be thereby enhanced.

To achieve the above-mentioned purpose, the present invention provides a safety warning method which comprises the following steps. Step 1 is directed to generate a plurality of distance sensing signals by an optical object ranging module according to an approaching object. Step 2 is directed to obtain a relative distance trend according to the distance sensing signals and a corresponding time thereof. Step 3 is directed to generate a control signal according to the relative distance trend. Step 4 is directed to drive and control a warning module to generate a warning signal according to the control signal.

According to an embodiment of the present invention, wherein the optical object ranging module further generates a corresponding image information according to the approaching object, and wherein the control signal is generated according to the relative distance trend and the image information.

According to an embodiment of the present invention, wherein the control signal serves to control flicker frequency and intensity of emitted light and decibels and/or frequency of emitted sound which are generated by the warning module.

According to an embodiment of the present invention, the safety warning method further comprises generating a motion signal by a movement sensing module and generating the control signal according to the motion signal.

According to an embodiment of the present invention, wherein the motion signal is generated by an acceleration sensing module and/or a gyroscope.

Furthermore, to achieve the purpose of the present invention, a safety warning device is also provided. The safety warning device comprises an optical object ranging module, a computation processing module, a driving control module and a warning module. The optical object ranging module serves to generate a plurality of distance sensing signals according to a relative distance between an approaching object and the optical object ranging module. The computation processing module is electrically coupled to the optical object ranging module and serve to compute and obtain relative distance trend according to the distance sensing signals and generate a control signal according to the relative distance trend. The driving control module is electrically coupled to the computation processing module and serve to generating a driving signal according to the control signal. The warning module is electrically coupled to the driving control module and serve to generate a warning signal according to the driving signal.

According to an embodiment of the present invention, the safety warning device further comprises a movement sensing module being electrically coupled to the computation processing module and generating a motion signal, wherein the computation processing module generates the control signal according to the motion signal.

According to an embodiment of the present invention, wherein the movement sensing module is an acceleration sensing module and/or a gyroscope.

According to an embodiment of the present invention, wherein the optical object ranging module is a time-of-flight (ToF) ranging module.

According to an embodiment of the present invention, wherein the warning module is a light emitting module and/or a sound emitting module, and wherein the control signal serves to control flicker frequency and intensity of emitted light and decibels and/or frequency of emitted sound which are generated by the warning module.

According to an embodiment of the present invention, wherein the optical object ranging module further generates and outputs a corresponding image information according to the approaching object.

Moreover, to achieve the purpose of the present invention, a mobile vehicle is also provided. The mobile vehicle is equipped with a safety warning device which is disposed on the mobile vehicle and faces toward a direction opposite to the moving direction of the mobile vehicle.

From the above, the safety warning device and safety warning method of the present invention may determine whether the approaching object is coming closer rapidly or has been immediately nearby the safety warning device, by means of obtaining a relative distance trend between the safety warning device and the approaching object.

In addition, according to different relative distance trends, the safety warning device and safety warning method may control flickering frequency and intensity of emitted light and decibels and/or frequency of emitted sound which are generated by the warning module, so as to dynamically drive the warning module to warn or alert the approaching object and thereby secure user of the safety warning device and method.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
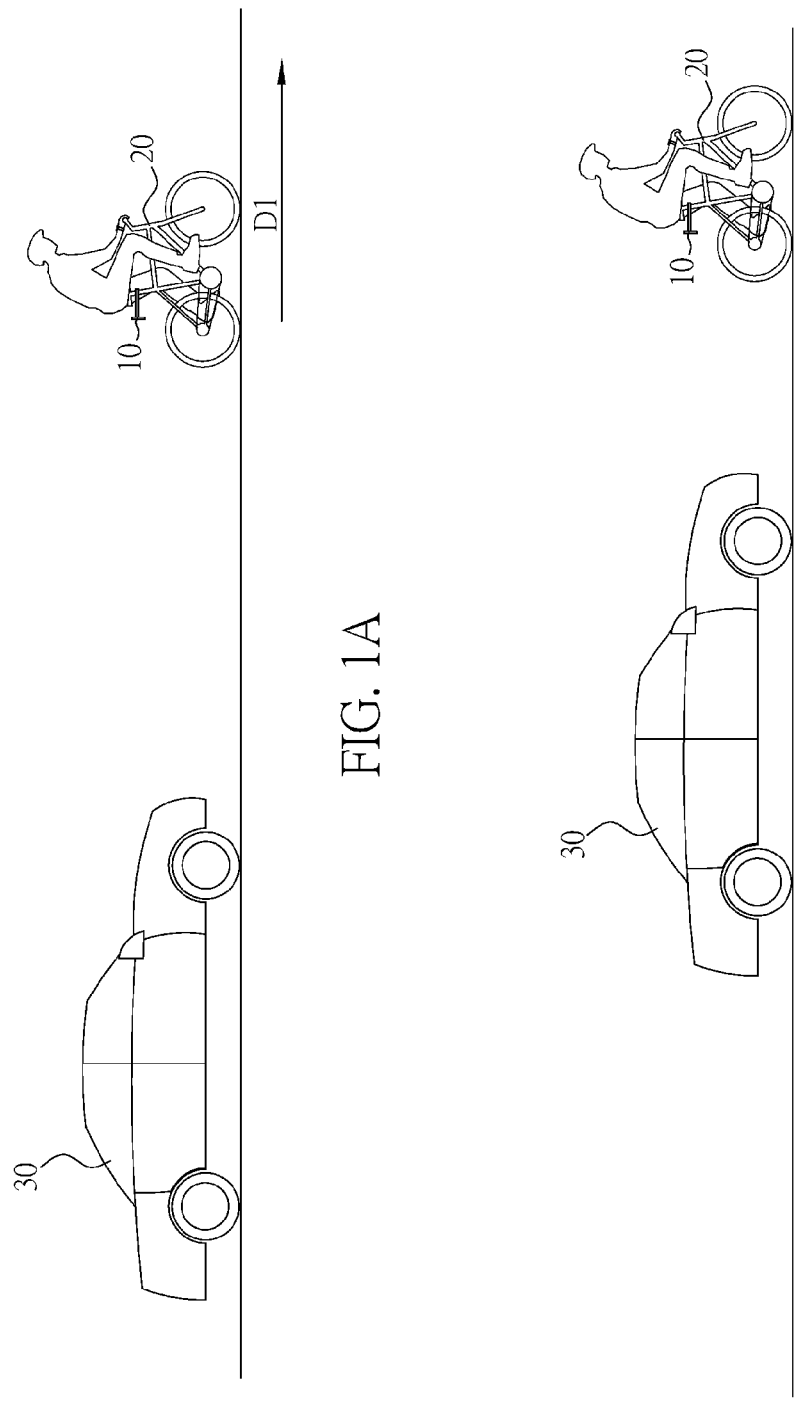
FIG. 1A is a schematic diagram illustrating relative position of a mobile vehicle and an approaching object at a first time point for the mobile vehicle according to a preferable embodiment of the present invention.
FIG. 1B is a schematic diagram illustrating relative position of the mobile vehicle and the approaching object at a second time point for the mobile vehicle according to a preferable embodiment of the present invention.
Figure 2:
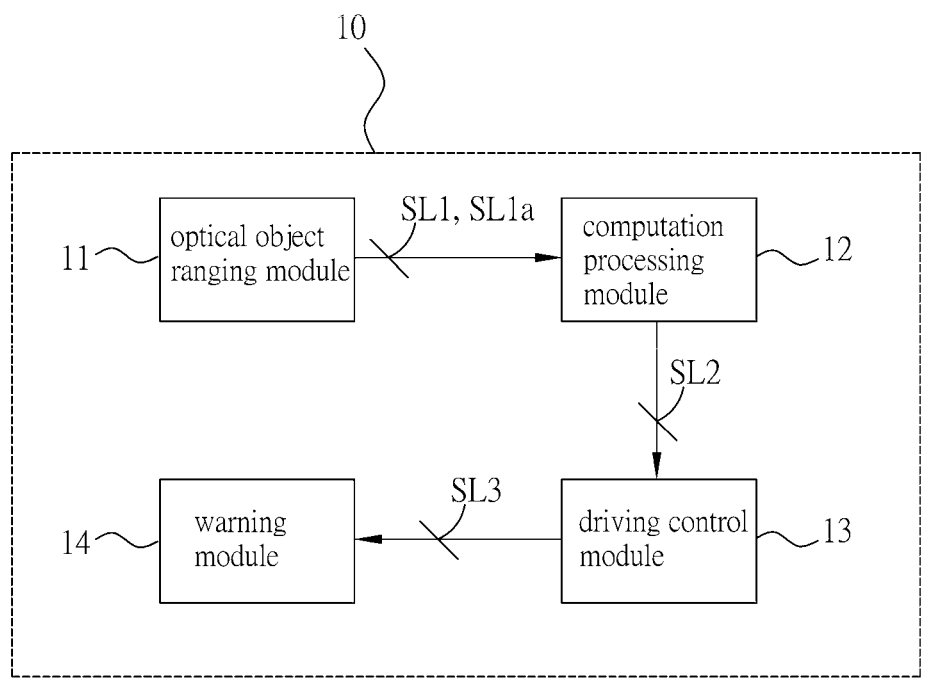
FIG. 2 is a block diagram illustrating a circuit structure of a safety warning device according to a preferable embodiment of the present invention.
Figure 3:
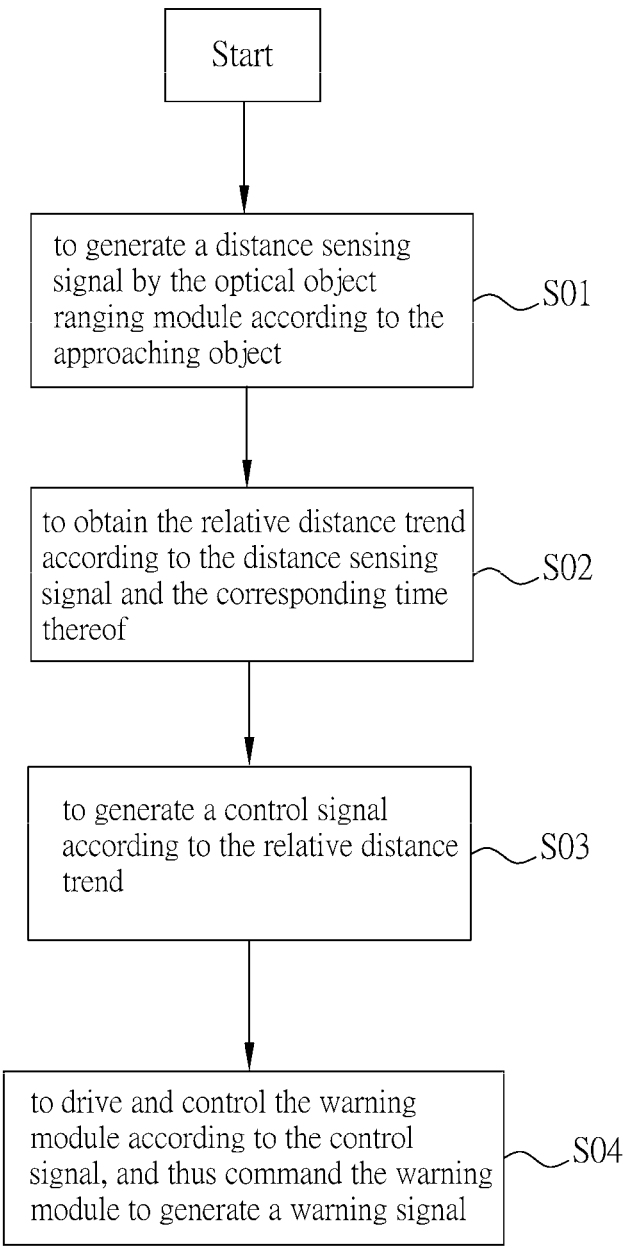
FIG. 3 is a flow diagram illustrating a safety warning method according to a preferable embodiment of the present invention.
Figure 4:
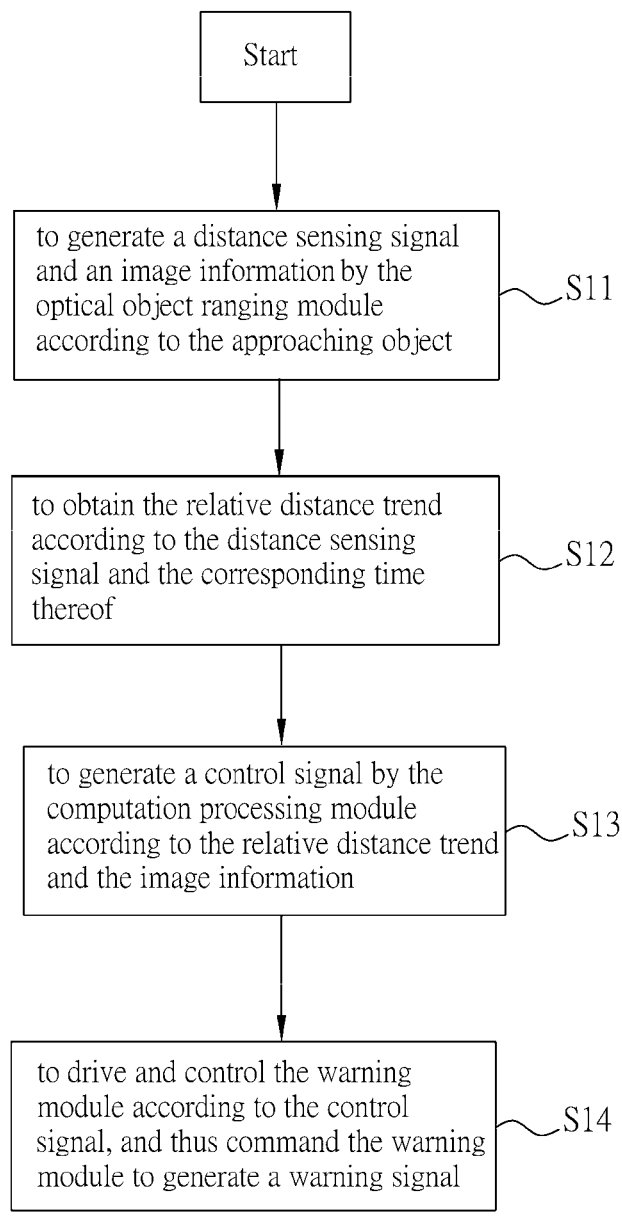
FIG. 4 is another flow diagram illustrating the safety warning method according to a preferable embodiment of the present invention.
Figure 5:
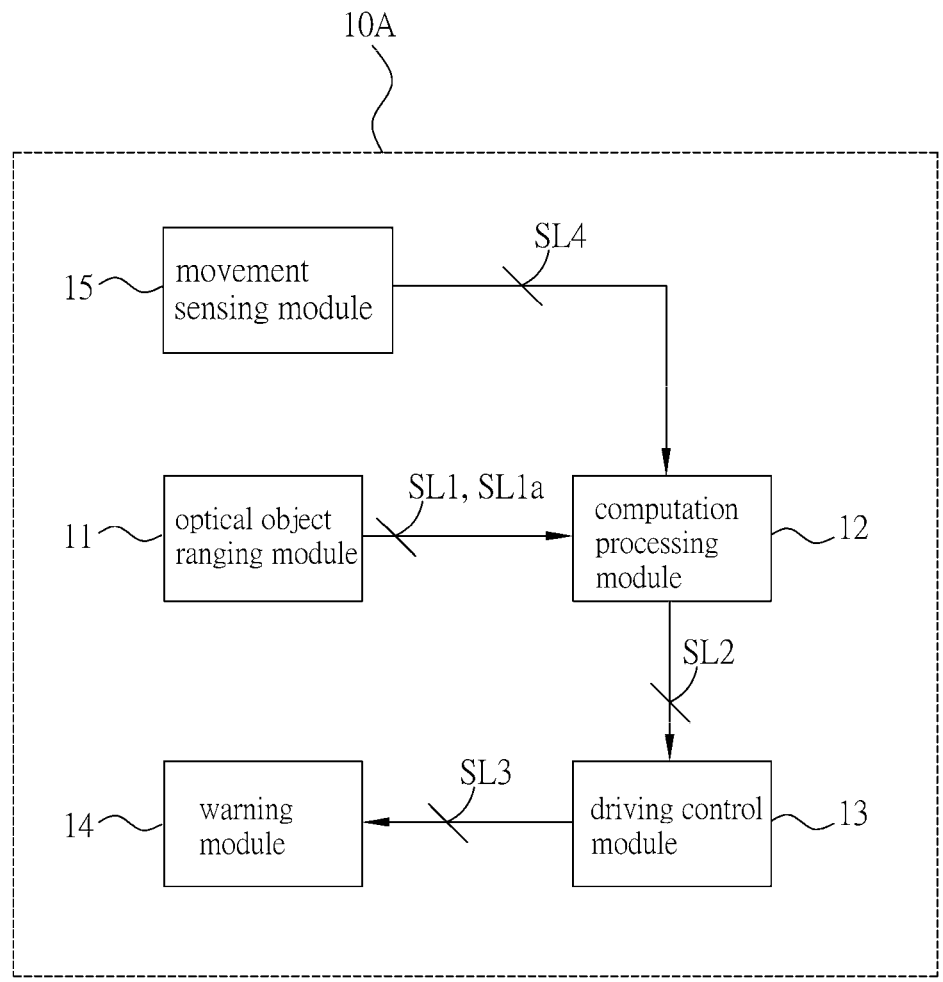
FIG. 5 is a block diagram illustrating another circuit structure of the safety warning device according to a preferable embodiment of the present invention.
Figure 6:
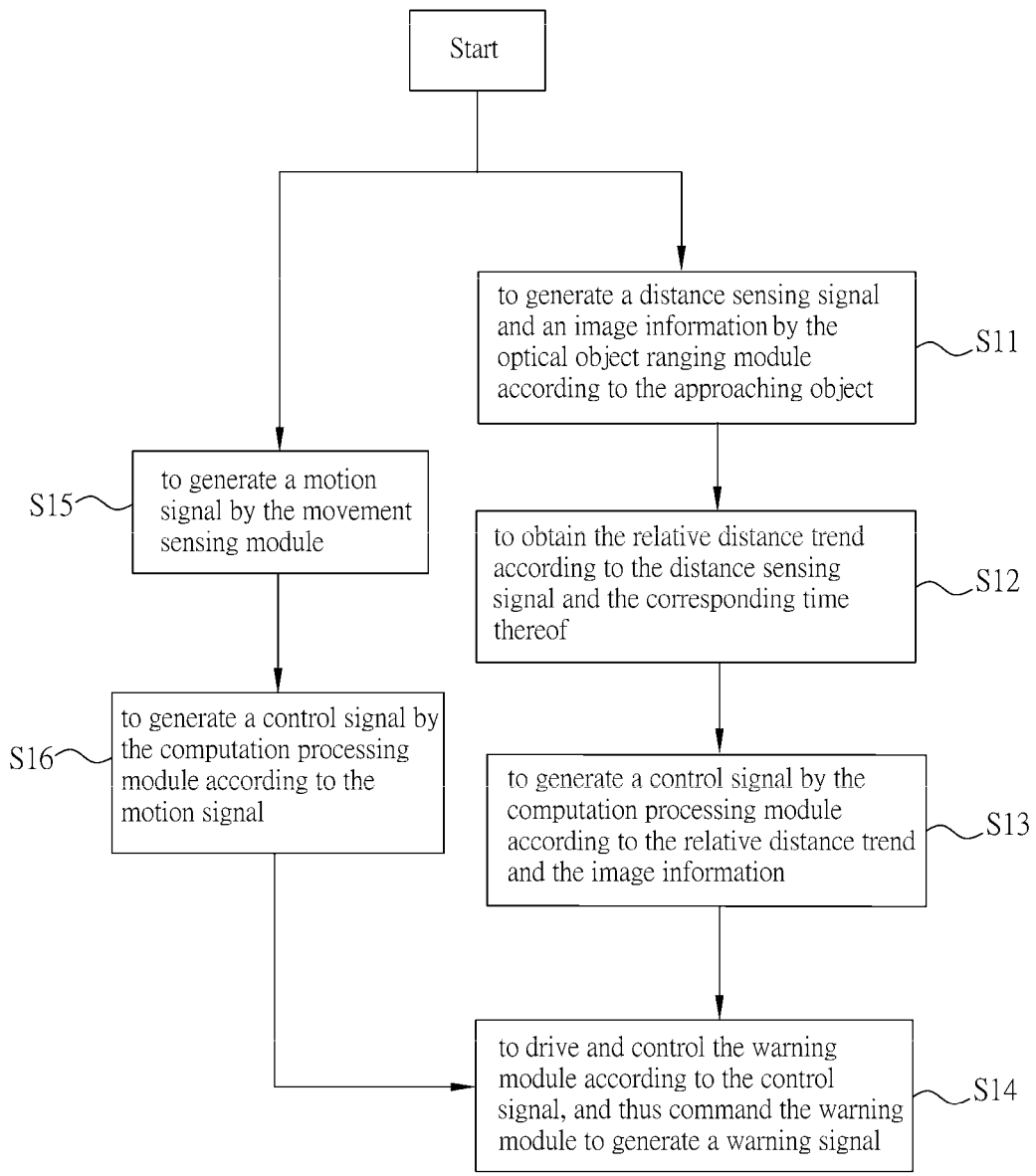
FIG. 6 is still another flow diagram illustrating the safety warning method according to a preferable embodiment of the present invention.

FIG. 1A is a schematic diagram illustrating relative position of a mobile vehicle and an approaching object at a first time point. FIG. 1B is a schematic diagram illustrating relative position of the mobile vehicle and the approaching object at a second time point. FIG. 2 is a block diagram illustrating a circuit structure of a safety warning device. FIG. 3 is a flow diagram illustrating a safety warning method utilizing the safety warning device of FIG. 2. FIG. 4 is another flow diagram illustrating the safety warning method utilizing the safety warning device of FIG. 2. FIG. 5 is a block diagram illustrating another circuit structure of the safety warning device. FIG. 6 is a flow diagram illustrating a safety warning method utilizing the safety warning device of FIG. 5.

Referring to FIG. 1A, a mobile vehicle 20 according to a preferable embodiment of the present invention may be equipped with a safety warning device 10. The mobile vehicle 20 may exemplarily include a bicycle, a skateboard, a car, a motorcycle or even a human body. Among the above, the bicycle is selected and taken as a representative example of the mobile vehicle 20 for describing this embodiment. The mobile vehicle 20 may have a moving direction D1, and the safety warning device 10 may be disposed as facing toward a direction opposite to the moving direction D1. In other words, if the mobile vehicle 20 moves forward, the safety warning device 10 is disposed at the rear of the moving vehicle 20 and faces backward, so that the safety warning device 10 can send a warning signal to warn or alert an approaching object 30 from the rear of the moving vehicle 20.

Referring to FIG. 1A and FIG. 2, the safety warning device 10 according to a preferable embodiment of the present invention may include an optical object ranging module 11, a computation processing module 12, a driving control module 13 and a warning module 14. The optical object ranging module 11 may be electrically coupled to the computation processing module 12. Furthermore, the computation processing module 12 may be electrically coupled to the driving control module 13. Moreover, the driving control module 13 may be electrically coupled to the warning module 14.

The optical object ranging module 11 may generate a plurality of distance sensing signals SL1 according to a relative distance between the optical object ranging module 11 and the approaching object 30. Wherein, the plurality of distance sensing signals SL1 may respectively indicate corresponding relative distances between the optical object ranging module 11 and the approaching object 30 at different time points. As shown in FIG. 1A and FIG. 1B, corresponding relative positions for the approaching object 30 and the mobile vehicle 20 at a first time point and a second time point are respectively illustrated.

In this embodiment, the optical object ranging module 11 may be a three-dimensional (3D) image sensing module, for example, a time-of-flight (ToF) ranging and sensing module. Furthermore, the optical object ranging module 11 may substantially include an image sensing element and a light emitting element. Wherein, the image sensing element may be, for example, a CMOS or CCD. On the other hand, the light emitting element may be, for example, a light emitting diode (LED) or a laser diode having an emitted light with a wavelength ranging from approximately 800 nm to 1050 nm, which is therefore an infrared ray.

According to a time-of-flight of the emitted light from the light emitting element through the air, the optical object ranging module 11 may calculate a distance between the approaching object 30 and the optical object ranging module 11 itself. More particularly, the optical object ranging module 11 may measure intensity of the emitted light irradiating the approaching object 30 and phase difference of the reflected light, with the aid of each pixel of the image sensing element cooperating with the light emitting element. In this manner, corresponding focal depth of the concerned pixel (corresponding to a point or a region of the approaching object 30) can be calculated and obtained. In addition, as the above sensing procedure for each pixel of the image sensing element is performed and completed, an image information SL1a associated with the approaching object 30 can be obtained.

The computation processing module 12 may calculate and obtain a relative distance trend according to the distance sensing signals SL1, and generate a control signal SL2 according to the relative distance trend. The relative distance trend may indicate a change of distance between the approaching object 30 and the optical object ranging module 11. Wherein, the relative distance trend may indicate that the approaching object 30 is coming closer to the optical object ranging module 11, or leaving away from the optical object ranging module 11. Furthermore, the computation processing module 12 may execute an image recognition procedure according to the image information SL1a, so as to recognize the approaching object 30 as a specified object, such as a human body, an animal, a motorcycle, a car or a bicycle. Accordingly, the image information SL1a may thus be incorporated into a determination procedure for generating the control signal SL2.

The driving control module 13 may generate a driving signal SL3 according to the control signal SL2. Thereafter, the warning module 14 may generate a warning signal according to the driving signal SL3. In this embodiment, the warning module 14 may be a light emitting module or a sound emitting module, or a single module with both functions of light-emitting and sound-emitting. The driving signal SL3 which is converted from the control signal SL2, may serve to control flickering frequency and intensity of emitted light and decibels and/or frequency of emitted sound which are generated by the warning module 14.

Hereinafter, referring to FIG. 1A to FIG. 3, a safety warning method according to a preferable embodiment of the present invention will be described. Wherein, FIG. 3 is a flow diagram of the safety warning method. The safety warning method includes steps S01 to S04.

Step S01 is directed to generate a plurality of distance sensing signal SL1 by the optical object ranging module 11 according to the approaching object 30. For example, as respectively illustrated in FIG. 1A and FIG. 1B, at least two distance sensing signals SL1 are generated, which indicate corresponding distances between the approaching object 30 and the optical object ranging module 11.

Step S02 is directed to obtain the relative distance trend according to the distance sensing signal SL1 and the corresponding time thereof. More particularly, the mentioned relative distance trend may indicate that the approaching object 30 is coming closer or leaving away. Furthermore, the slope of the relative distance trend may indicate a velocity of approaching.

Step S03 is directed to generate a control signal SL2 according to the relative distance trend. In this embodiment, if the relative distance trend indicates that the approaching object 30 is coming closer, or the slope of the relative distance trend is greater than a threshold, the warning module 14 has to warn or alert the approaching object 30 to catch its attention.

Step S04 is directed to drive and control the warning module 14 according to the control signal SL2, and thus command the warning module 14 to generate a warning signal. Wherein, the control signal SL2 may serve to control frequency and intensity of emitted light and decibels and/or frequency of emitted sound, which are generated by the warning module 14.

More particularly, in the above-mentioned safety warning method, weighted value(s) may be provided so as to adjust the desired corresponding control signal SL2.

For example, if the relative distance trend indicates that the approaching object 30 is coming closer rapidly or the approaching object 30 has been immediately nearby the mobile vehicle 20, greater weighted values may be assigned. Given the above, if a greater or higher weighted value is assigned, the warning module 14 should correspondingly output a warning signal with emitted light of higher flickering frequency or greater intensity, or with emitted sound of greater decibels or higher frequency. By way of the above, the warning module 14 is able to warn or alert approaching object 30 effectively.

Thereafter, referring to FIG. 4 which shows another flow diagram of the safety warning method according to a preferable embodiment of the present invention. As shown in FIG. 4, the safety warning method of this embodiment may include steps S11 to S14. Differences between steps S11 to S14 shown in FIG. 4 and steps S01 to S04 shown in FIG. 3 will be described in the following paragraphs.

In step S11, the optical object ranging module 11 may further generate an image information SL1a other than the distance sensing signal SL1. Image information SL1a of different resolutions may be obtained according to capability of the image sensing element in the optical object ranging module 11.

Step S12 may be the same as step S02, wherein the computation processing module 12 may obtain the relative distance trend according to the distance sensing signal SL1 and its correspond time.

Step S13 is directed to generate a control signal SL2 by the computation processing module 12 according to the relative distance trend and the image information SL1a. In this embodiment, if the relative distance trend indicates that the approaching object 30 comes closer or the approaching object 30 may threaten and endanger the mobile vehicle 20, the warning module 14 may have to warn or alert the approaching object 30 and thus catch its attention.

Step S14 may be the same as step S04, wherein the warning module 14 is driven and controlled according to the control signal SL2, so as to generate warning signal.

Thereafter, referring to FIG. 5 again, wherein another circuit structural diagram of the safety warning device according to a preferable embodiment of the present invention is illustrated.

The safety warning device 10A may include a optical object ranging module 11, a computation processing module 12, a driving control module 13, a warning module 14 and a movement sensing module 15. The above-mentioned optical object ranging module 11, computation processing module 12, driving control module 13 and warning module 14 may be similar to those according to the embodiment illustrated in FIG. 2, thus descriptions for modules 11 to 14 are omitted.

The movement sensing module 15 may be electrically coupled to the computation processing module 12. Furthermore, the movement sensing module 15 may generate a motion signal SL4. Moreover. The computation processing module 12 may generate a control signal SL2 according to the motion signal SL4. In this embodiment, the movement sensing module 15 may be an acceleration sensing module and/or a gyroscope. Movement sensing is performed with the aid of the acceleration sensing module and the gyroscope, accordingly, slowing down by braking of the mobile vehicle 20 or turning direction of the mobile vehicle 20 can be sensed accurately.

More particularly, in the above-mentioned embodiment, the warning signal may be passively generated according to the distance between the approaching object 30 and the mobile vehicle 20. In contrast, the movement sensing module 15 may actively generate a warning signal according to a change of motion of the mobile vehicle 20, so as to warn or alert pedestrian or car drivers around the mobile vehicle 20.

In addition, referring to FIG. 6, which shows another safety warning method applied to the safety warning device illustrated in FIG. 5. The safety warning method shown in FIG. 6 may include steps S11 to S16. Wherein, steps S11 to S14 may be similar to steps S01 to S04 as mentioned above, thus descriptions for similar portions thereof are not provided. On the other hand, differences between steps S11 to S14 and steps S01 to S04 will be described as follows.

First of all, step S15 is directed to generate a motion signal SL4 by the movement sensing module 15. Next, Step S16 is directed to generate a control signal SL2 by the computation processing module 12 according to the motion signal SL4. Thereafter, step S14 is executed, wherein the driving control module 13 may drive and control the warning module 14 to generate a warning signal, according to the control signal SL2.

In summary, the mobile vehicle, safety warning device and safety warning method of the present invention may obtain a relative distance trend between the approaching object and the mobile vehicle itself. With the aid of the relative distance trend, it can be determined whether the approaching object 30 may come closer rapidly, may have been much closer, or may threaten and endanger the mobile vehicle 20. Thereafter, flickering frequency and intensity of emitted light and decibels and/or frequency of emitted sound which are generated by the warning module, can be controlled and adjusted according to different relative distance trends and image information. In this manner, the warning module can be dynamically driven to warn the approaching object, and safety for user of the mobile vehicle equipped with such a safety warning device can be therefore enhanced.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A safety warning method, comprising:
generating a plurality of distance sensing signals by an optical object ranging module according to an approaching object;
obtaining a relative distance trend according to the distance sensing signals and a corresponding time thereof;
generating a control signal according to the relative distance trend;
generating a motion signal by a movement sensing module, wherein the movement sensing module is an acceleration sensing module and/or a gyroscope for sensing change of motion of a mobile vehicle so as to generate the motion signal;
generating the control signal according to the motion signal; and
driving and controlling a warning module to generate a warning signal according to the control signal.

2. The safety warning method of claim 1, wherein the optical object ranging module further generates a corresponding image information according to the approaching object, and wherein the control signal is generated according to the relative distance trend and the image information.

3. The safety warning method of claim 1, wherein the control signal serves to control flicker frequency and intensity of emitted light and decibels and/or frequency of emitted sound which are generated by the warning module.

4. A safety warning device, comprising:
an optical object ranging module, for generating a plurality of distance sensing signals according to a relative distance between an approaching object and the optical object ranging module;
a computation processing module, being electrically coupled to the optical object ranging module, for computing and obtaining a relative distance trend according to the distance sensing signals, and generating a control signal according to the relative distance trend;
a movement sensing module, being electrically coupled to the computation processing module, wherein the movement sensing module is an acceleration sensing module and/or a gyroscope for sensing change of motion of a mobile vehicle so as to generate a motion signal, and the control signal is generated according to the motion signal;
a driving control module, being electrically coupled to the computation processing module, for generating a driving signal according to the control signal; and
a warning module, being electrically coupled to the driving control module, for generating a warning signal according to the driving signal.

5. The safety warning device of claim 4, wherein the optical object ranging module is a time-of-flight (ToF) ranging module.

6. The safety warning device of claim 4, wherein the warning module is a light emitting module and/or a sound emitting module, and wherein the control signal serves to control flicker frequency and intensity of emitted light and decibels and/or frequency of emitted sound which are generated by the warning module.

7. The safety warning device of claim 4, wherein the optical object ranging module further generates and outputs a corresponding image information according to the approaching object.

8. A mobile vehicle, comprising:
a safety warning device facing toward a direction opposite to the moving direction of the mobile vehicle, comprising:
an optical object ranging module, for generating a plurality of distance sensing signals according to a relative distance between an approaching object and the optical object ranging module;
a computation processing module, being electrically coupled to the optical object ranging module, for computing and obtaining a relative distance trend according to the distance sensing signals, and generating a control signal according to the relative distance trend;
a movement sensing module, being electrically coupled to the computation processing module, wherein the movement sensing module is an acceleration sensing module and/or a gyroscope for sensing change of motion of a mobile vehicle so as to generate a motion signal, and the control signal is generated according to the motion signal;
a driving control module, being electrically coupled to the computation processing module, for generating a driving signal according to the control signal; and a warning module, being electrically coupled to the driving control module, for generating a warning signal according to the driving signal.

9. The mobile vehicle of claim 8, wherein the optical object ranging module is a time-of-flight (ToF) ranging module.

10. The mobile vehicle of claim 8, wherein the warning module is a light emitting module and/or a sound emitting module, and wherein the control signal serves to control flicker frequency and intensity of emitted light and decibels and/or frequency of emitted sound which are generated by the warning module.

11. The mobile vehicle of claim 8, wherein the optical object ranging module further generates and outputs a corresponding image information according to the approaching object.

\* \* \* \* \*